(12) United States Patent
Takaoka et al.

(10) Patent No.: US 8,016,491 B2
(45) Date of Patent: Sep. 13, 2011

(54) OPTICAL FERRULE

(75) Inventors: Atsushi Takaoka, Sakura (JP); Akito Nishimura, Yotsukaido (JP); Yukio Hayashi, Yotsukaido (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/543,025

(22) Filed: Aug. 18, 2009

(65) Prior Publication Data

US 2011/0044589 A1 Feb. 24, 2011

(51) Int. Cl.
*G02B 6/38* (2006.01)
(52) U.S. Cl. ............... 385/60; 385/53; 385/55; 385/56; 385/58
(58) Field of Classification Search ............... 385/53, 385/55, 56, 58, 60
See application file for complete search history.

(56) References Cited

U.S. PATENT DOCUMENTS

| 2001/0036341 A1 * | 11/2001 | Ohtsuka et al. ............... 385/78 |
| 2001/0036342 A1 | 11/2001 | Knecht et al. |
| 2002/0102068 A1 | 8/2002 | Ohtsuka et al. |
| 2004/0152354 A1 * | 8/2004 | Luther et al. ............... 439/378 |

FOREIGN PATENT DOCUMENTS

JP 2004-93992 A 3/2004

* cited by examiner

*Primary Examiner* — Jennifer Doan
(74) *Attorney, Agent, or Firm* — Sughrue Mion, PLLC

(57) ABSTRACT

An optical ferrule butt-connected in an optical adapter, includes: a ferrule main body; a connection end face in a front surface of the main body; a pair of grooves on the connection end face of the main body; guide pin insertion holes in bottom surfaces of the respective grooves; optical fiber insertion holes in the connection end face, the holes being arranged in a line; and foreign material collecting portions at least at a pair of corresponding sides of the connection end face. The groove has a width larger than a diameter of the guide pin insertion hole. The foreign material collecting portions respectively have a wall for connecting the connection end face with a side surface of the ferrule main body to form a space for collecting a foreign material with an opposite connection end face of a corresponding optical ferrule and an inner wall of the optical adapter.

2 Claims, 4 Drawing Sheets

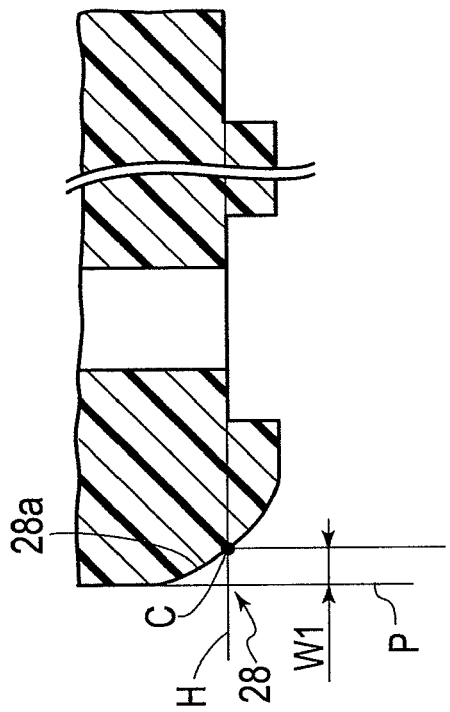
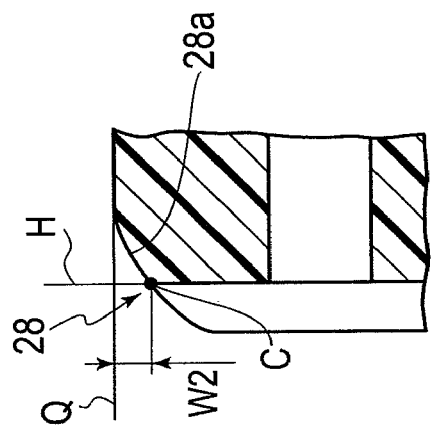
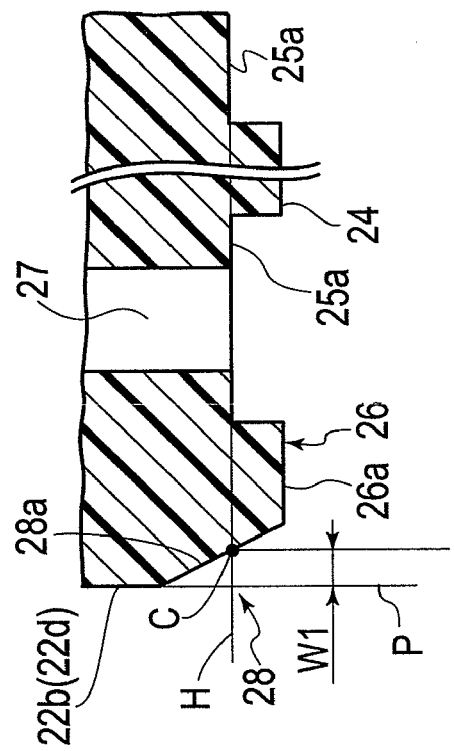
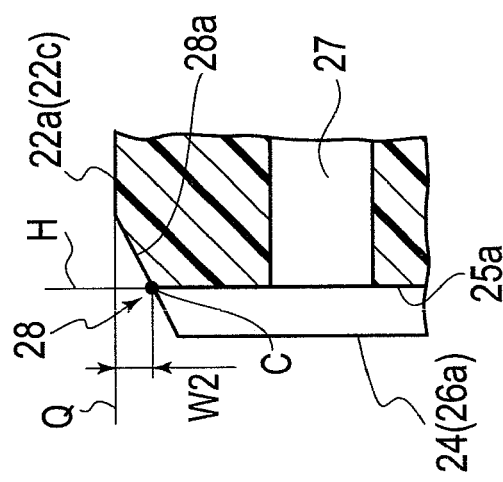

OPTICAL FERRULE

BACKGROUND OF THE INVENTION

1. Field of the Invention

The present invention relates to an optical ferrule. Specifically, the present invention relates to an optical ferrule that is butt-connected in an optical adapter by being guided by guide pins.

2. Description of the Related Art

In general, an optical ferrule (optical connector), which is standardized according to JIS C 5981, IEC 61754-5 and the like, is called an MT (Mechanically Transferable) ferrule (MT connector). The MT ferrule is used for connecting one or more optical, and has a positioning mechanism by use of guide pins for a high-accuracy positioning of each optical fiber.

The MT ferrule is provided with a pair of guide pin insertion holes on an end surface thereof to insert the guide pins for positioning the optical ferrule, and also provided with optical fiber insertion holes to insert the respective optical fibers between the guide pins. The optical fiber insertion holes are aligned in the same direction as a direction in which the two guide pin insertion holes are arrayed. The respective optical fibers are inserted into the optical fiber insertion holes from a rear end of the MT ferrule, and fixed by filling with an adhesive agent from an opening potion on an upper surface of the MT ferrule.

According to the above-mentioned Japanese Industrial Standards, a spring clamp is employed for the connection of the MT ferrule. Meanwhile, an optical adapter that is easy to handle the connection can be used. The optical adapter, which is formed in a shape of a rectangular cylinder, is provided with openings for inserting the MT ferrule, and a latch mechanism inside the openings. The latch mechanism is configured as a flexible arm provided with a claw at a front edge portion thereof. A base portion of the arm is fixed to an inner wall of the optical adapter. When the MT ferrule is inserted into the optical adapter, the claw locks a flange formed at a rear portion of the MT ferrule so that the MT ferrule is securely fixed in the optical adapter.

The MT ferrule is optically connected by means of a so-called PC (Physical Contact) connection. In such a case, optical transmission performance is strongly dependent on connecting conditions such as axis misalignment and inclination of optical fibers, and gaps between each optical fiber. Therefore, it is necessary to remove foreign materials adhered to a connection end face of the MT ferrule during connecting so as to avoid the increase of connection loss. The foreign materials are commonly wiped off by use of a cleaner. However, connection loss at the PC connection may increase during wiping off, because some of the foreign materials may be gathered and deposited around base portions of the guide pins.

Japanese Patent Application Laid-Open Publication No. 2004-093992 (Patent Document 1) discloses a MT ferrule capable of lowering connection loss caused by deposition of foreign materials. According to Patent Document 1, the MT ferrule is provided with a pair of grooves with a certain depth on a connection end face, in which the grooves are provided perpendicular to an alignment of optical fiber insertion holes. While, guide pin insertion holes are formed in bottom surfaces of the respective grooves. Thus, it is possible to prevent the foreign materials from interfering a PC connection since the rest of the foreign materials after cleaning are gathered in the grooves.

SUMMARY OF THE INVENTION

In general, connection loss caused by foreign materials does not affect short-distance communication with several tens of meters using multimode optical fibers. This is because a necessary optical intensity for communication has been achieved even if connection loss is caused at connection points since margins to ensure stable communication have been enough.

Meanwhile, a demand to use the multimode optical fibers for long-distance communication with several hundreds of meters has been increased. The multimode optical fibers are less expensive than single optical fibers. Thus, it is possible to create a network at low cost. However, on the other hand, connection loss of the multimode optical fibers at connection points is considerable since a damping rate of the multimode optical fibers is higher than the single optical fibers. Recently, optical fibers are often used in circumstances with a lot of foreign materials. Therefore, it is necessary to reduce connection loss due to the foreign materials.

The present invention has been made in consideration for the above-mentioned problem. It is an object of the present invention to provide an optical ferrule capable of controlling an increase of connection loss due to foreign materials between connection end faces, and capable of maintaining a good PC connection.

The aspect of the present invention provides an optical ferrule butt-connected in an optical adapter, comprising: a ferrule main body; a connection end face formed in a front surface of the ferrule main body; a pair of grooves formed on the connection end face of the ferrule main body, the grooves extending from one end edge of the connection end face to an opposite end edge thereof; guide pin insertion holes formed in bottom surfaces of the respective grooves; a plurality of optical fiber insertion holes formed in the connection end face and arranged in at least one line; and foreign material collecting portions provided at least at a pair of corresponding sides of the connection end face. A width of each groove is larger than a diameter of each guide pin insertion hole. The foreign material collecting portions respectively have a wall for connecting the connection end face with a side surface of the ferrule main body. The wall is provided so as to form a space for collecting a foreign material with an opposite connection end face of a corresponding optical ferrule and an inner wall of the optical adapter.

According to the optical ferrule described above, the rest of foreign materials after cleaning when a connection process are deposited in the grooves, and therefore, the deposited foreign materials are prevented from entering spaces between each connection end face during a butt-connection. In addition, even if the optical ferrule gathers up the foreign materials on inner walls of the optical adapter during the butt-connection, the foreign materials are collected in the collecting portion. Thus, the increase of connection loss due to the foreign materials can be avoided.

BRIEF DESCRIPTION OF THE SEVERAL VIEWS OF THE DRAWING

FIGS. 4A and 4B are schematic views showing a part of a horizontal cross-section of an optical ferrule according to an embodiment of the present invention.

FIGS. 5A and 5B are schematic views showing a part of a vertical cross-section of an optical ferrule according to an embodiment of the present invention.

FIG. 6A is in an early stage, FIG. 6B is in a middle stage, and FIG. 6C is in a later stage.

FIG. 7A is in an early stage, FIG. 7B is in a middle stage, and FIG. 7C is in a later stage.

DETAILED DESCRIPTION OF THE INVENTION

Hereinafter, description will be made below in detail of an embodiment of the present invention.

An optical ferrule according to the present embodiment is an MT ferrule standardized according to JISC 5981, IEC 61754-5 and the like. As similar to a conventional MT ferrule, the optical ferrule according to the present embodiment is positioned by guide pins. Then, respective optical fibers in a corresponding MT ferrule are connected by means of a PC connection.

Note that, in the following description, directions or locations are defined as follows. A side provided with a connection end face 21 of a ferrule body 22 is defined as a "front" side, and a side located on the opposite side of the connection end face 21 is defined as a "rear" side. The connection end face 21 has a plurality of optical fiber insertion holes 21a arranged in at least one line. Thus, a direction along the line is defined as a "right" or "left" direction, and a direction perpendicular to the line is defined as a "vertical" direction.

Figure 1:
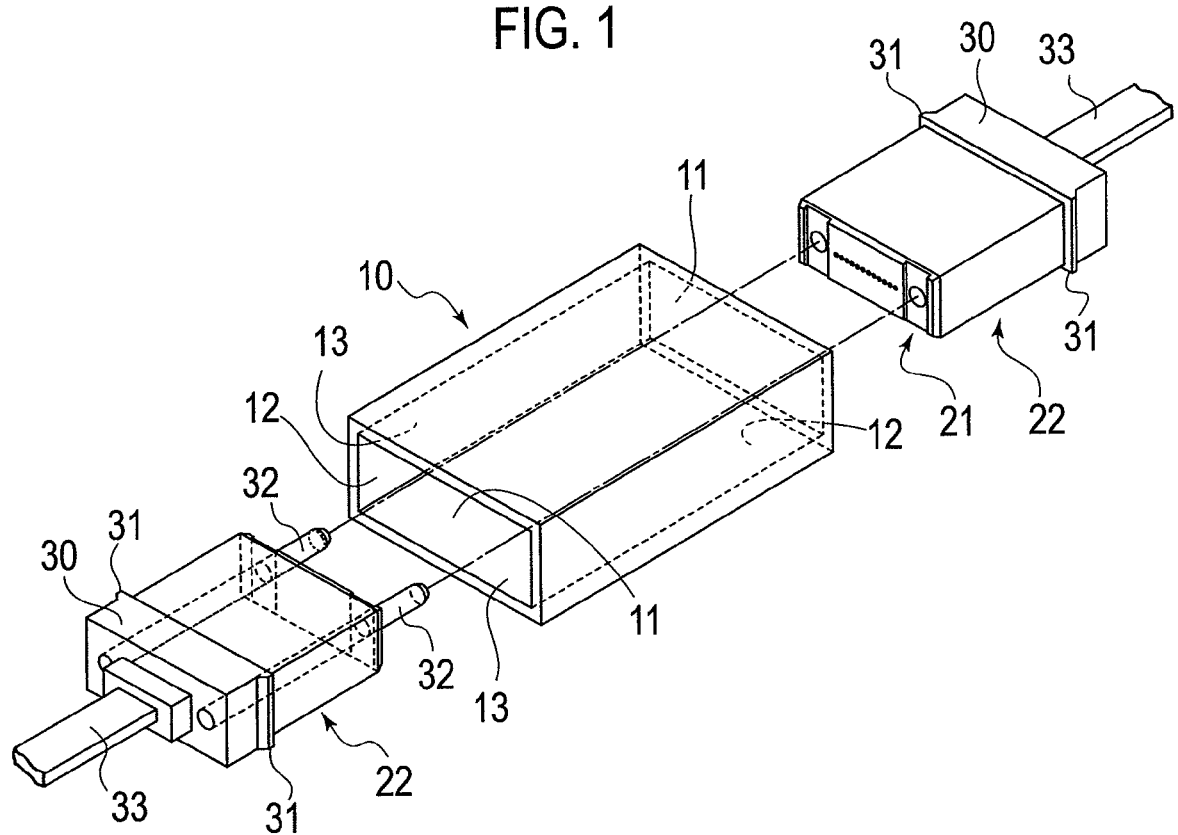
FIG. 1 is a schematic view showing an optical ferrule according to an embodiment of the present invention.

As shown in FIG. 1, a pair of ferrule main bodies 22 and 22 according to the present embodiment are inserted in an optical adapter 10 in a direction defined by a pair of guide pins 32 and 32, thereafter they are butt-connected. The optical adapter 10 has a shape of a rectangular cylinder, for instance. The optical adapter 10 has openings 11 and 11 where the ferrule main bodies 22 and 22 are inserted, and has a latch mechanism (not shown) therein. The latch mechanism is configured, for instance, as a pair of flexible arms (not shown) provided at right and left inner walls 12 and 12, respectively. The respective arms are provided with claws (not shown) at front edge portions thereof. Base portions of the arms are fixed to the right and left inner walls 12 and 12 of the optical adapter 10. The arms can be integrally formed with the optical adapter 10. The latch mechanism locks protrusions 31 of flanges 30 formed in the respective ferrule main bodies 22 and 22, thereby holding the ferrule main bodies 22 and 22 in the optical adapter 10. The openings 11 and 11 of the optical adapter 10 are formed in an approximately rectangular shape so as to insert the ferrule main bodies 22 and 22. A width and a height of each opening 11 are little larger than those of each connection end face 21.

Figure 2:
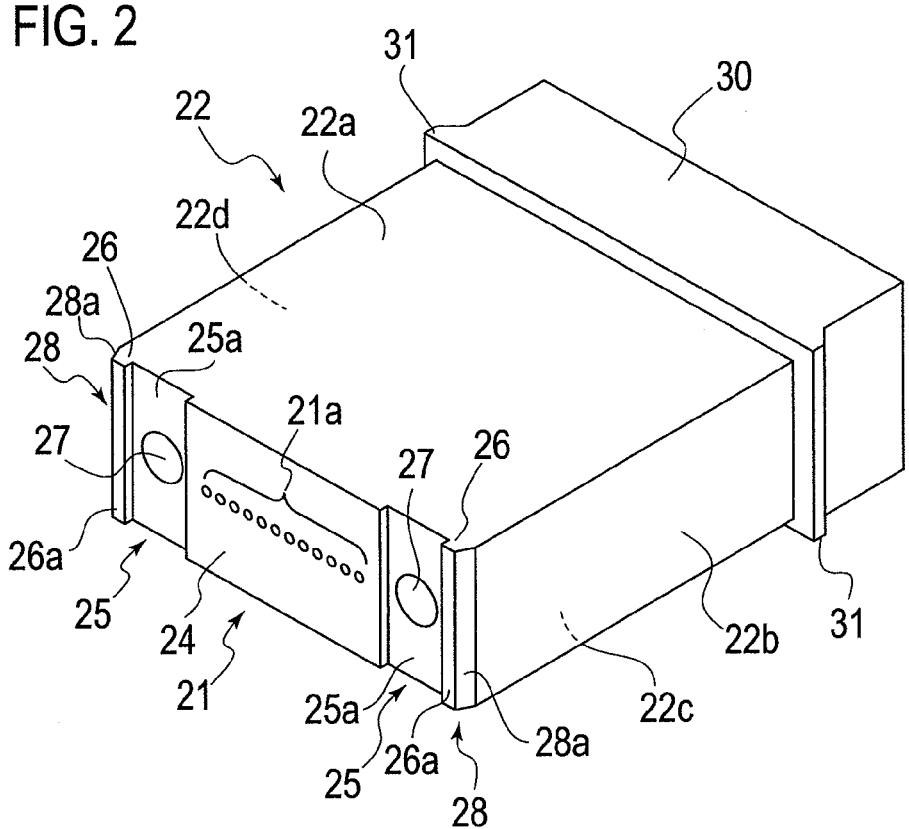
FIG. 2 is a perspective view showing an optical ferrule according to an embodiment of the present invention.

As shown in FIG. 2, a front portion of the ferrule main body 22 is formed so as to have a rectangular cross-sectional shape. A front surface of the ferrule main body 22 is provided with the connection end face 21 facing an opposite connection end face of the corresponding ferrule main body 22 (also refer to FIG. 1). The ferrule main body 22 is provided with the flange 30 at a rear portion thereof, in which a plurality of optical fibers 33 (e.g. an optical fiber ribbon) is inserted (also refer to FIG. 1). The optical fibers 33 are inserted into the optical fiber insertion holes 21a through the flange 30, and fixed by use of an adhesive agent. The connection end face 21 is provided with a joint area 24, grooves 25 and 25, and protrusions 26 and 26. The joint area 24 has the plurality of the optical fiber insertion holes 21a arranged in at least one line. The respective optical fiber insertion holes 21a are aligned from one of the grooves 25 and 25 to the other thereof, for instance. When the optical fiber insertion holes 21a are arranged in several lines, the respective lines are to be parallel to each other. The protrusions 26 and 26 are formed at right and left sides of the joint area 24, respectively. The grooves 25 and 25 are formed between the joint area 24 and the respective protrusions 26 and 26. Guide pin insertion holes 27 and 27 for positioning the optical ferrule are formed in bottom surfaces 25a and 25a of the respective grooves 25 and 25.

In the connection end face 21, the grooves 25 and 25 are formed from a front end edge of an upper surface 22a of the ferrule main body 22 to a front end edge of a lower surface 22c of the ferrule main body 22. In other words, the grooves 25 and 25 are formed extending through the ferrule main body 22 in a vertical direction. In addition, the respective grooves 25 and 25 have a width larger than a diameter of the respective guide pin insertion holes 27 and 27. Openings of the respective guide pin insertion holes 27 and 27 are formed within the bottom surfaces of the respective grooves 25 and 25.

The connection end face 21 is cleaned by use of a cleaner (not shown) before the butt-connection. In such a case, some of foreign materials may be moved in a right or left direction by being pushed aside by the cleaner. In conventional optical ferrules, such foreign materials are trapped between the connection end faces, thereby resulting in an increase in connection loss. Especially, the remaining foreign materials usually gather by base portions of the guide pins 32 and 32 protruding from the guide pin insertion holes 27 and 27. However, in the optical ferrule of the present embodiment, the remaining foreign materials fall into the grooves 25 and 25. Therefore, the pair of the connection end faces 21 and 21 are appropriately connected each other, which avoids the increase of connection loss caused by such foreign materials.

The protrusions 26 and 26 are provided between the respective grooves 25 and 25 and side surfaces 22b and 22d. Front end surfaces 26a and 26a and the joint area 24 are formed by polishing the connection end face 21. Note that, the front end surfaces 26a and 26a of the protrusions 26 and 26 are located on approximately the same level with the joint area 24. The pair of the front end surfaces 26a and 26a of the ferrule main body 22 come into contact with another pair of the front end surfaces 26a and 26a of the corresponding ferrule main body 22 at the butt-connection of the respective ferrule main bodies 22 and 22. Due to such a connection, it is possible to avoid relative oscillation, shaking, inclination and the like of the ferrule main bodies 22 and 22. Moreover, such a connection stabilizes a position of the ferrule main bodies 22 and 22 butt-connected, and a connection between the joint areas 24 and 24.

The optical fibers inserted into the optical fiber insertion holes 21a slightly protrude (1 to 3 μm) from the joint area 24 according to the above-mentioned Japanese Industrial Standards. Thus, it is difficult to prevent the ferrule main bodies 22 and 22 from wobbling at the butt-connection only by use of the joint areas 24 and 24, and this may cause a PC connection to be unstable. However, according to the optical ferrule of the present embodiment, the connection between the front end surfaces 26a and 26a of the protrusions 26 and 26 provided at the both sides of the respective joint areas 24 and 24 keeps the joint areas 24 and 24 in a stable position, thereby maintaining an even pressure between the joint areas 24 and 24. Therefore, a stable PC connection can be achieved since the optical fibers inserted into and fixed to the respective optical fiber insertion holes 21a can be connected to the corresponding optical fibers at an even pressure. Note that, the protrusions 26 and 26 may be composed of a plurality of protrusions arranged in a vertical direction of the connection end face 21, for instance. In such a case, front end surfaces of the respective protrusions configured as each protrusion 26 are also located on approximately the same level with the joint area 24.

In addition, the optical ferrule according to the present embodiment has the grooves 25 and 25 and the protrusions 26 and 26, in which the protrusions 26 and 26 function as a support to avoid wobble of the optical ferrule. Therefore, it is possible to prevent the joint area 24 from being unnecessarily polished by excess force (which results in, for instance, an uneven or inclined polished surface) during polishing for a PC connection.

As shown in FIG. 2, foreign material collecting portions 28 and 28 are provided between the front end surfaces 26a and 26a of the protrusions 26 and 26 and the side surfaces 22b and 22d of the ferrule main body 22. A pair of corresponding sides (opposite side edges) of the connection end face 21 are provided with the foreign material collecting portions 28 and 28, each of which is preferably configured as a wall 28a. FIG. 2 shows a configuration in which the foreign material collecting portions 28 and 28 are provided at the right and left sides of the connection end face 21. Each wall 28a is provided so as to connect the connection end face 21 and the side surfaces 22b and 22d of the ferrule main body 22. Thus, each wall 28a is configured as a flat or curved surface inclined toward the side surfaces 22b and 22d from the connection end face 21. FIG. 4A shows an example of the wall 28a that has a flat surface, and FIG. 4B shows an example of the wall 28a that has a curved surface. According to the configurations shown in FIGS. 4A and 4B and the connecting condition shown in FIG. 1, the wall 28a cooperates with the connection end face 21 of the opposite ferrule main body 21 and the inner wall 12 (refer to FIG. 1) of the optical adapter 10 to form a space for collecting foreign materials. In other words, when the ferrule main bodies 22 and 22 are butt-connected while each wall 28a has a flat surface or curved surface, a space having an approximately triangle-shaped cross-section is defined by the walls 28a and 28a of the ferrule main bodies 22 and 22 and the inner wall 12 of the optical adapter 10 facing the side walls 22b and 22b (22d and 22d). Therefore, the increase of connection loss during a PC connection can be avoided because foreign materials are collected in the space without entering a gap between the connection end faces 21 and 21. Moreover, in order to efficiently keep foreign materials adhered to the optical adapter 10 or the ferrule main bodies 22 and 22 in the space, or easily remove foreign materials adhered to the walls 28a and 28a, each wall 28a is preferably stretched from an end edge of the front end surface 26a of the protrusion 26 toward the side wall 22b (22d) by penetrating through a plane surface H including the bottom surface 25a of the groove 25. Thus, the foreign materials adhered to the ferrule main bodies 22 and 22 are easily removed before connecting. Specifically, a distance W1 between a cross line C of the plane surface H and the wall 28a and a plane surface P including the side wall 22b (22d) is preferably 10 μm or more.

Figure 3:
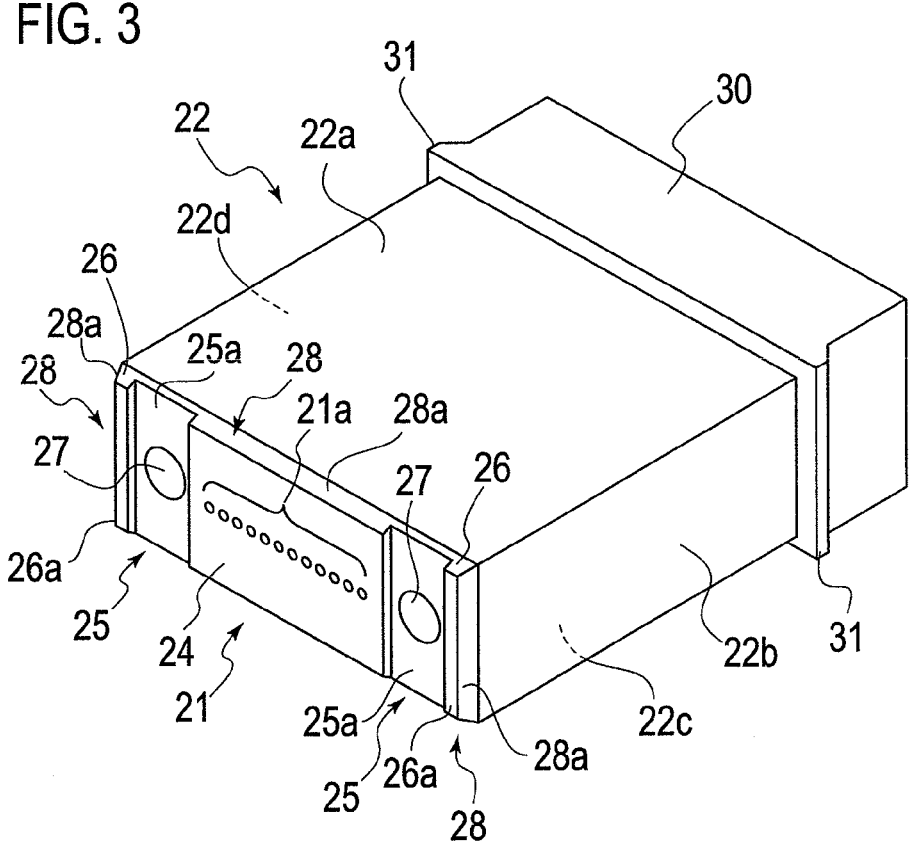
FIG. 3 is a perspective view showing an optical ferrule according to an embodiment of the present invention.

Furthermore, as shown in FIGS. 3, 5A and 5B, the foreign material collecting portions 28 and 28 may be also provided at upper and lower sides of the connection end face 21, in addition to the configuration shown in FIGS. 2, 4A and 4B. Namely, the foreign material collecting portions 28 according to the present embodiment can be provided at all sides (all end edges) of the connection end face 21. Specifically, a distance W2 between a cross line C of the plane surface H and the wall 28a and a plane surface Q including a surface 22a (22c) is preferably 10 μm or more. Similar to the configuration shown in FIGS. 4A and 4B, spaces for collecting foreign materials are formed by respective inner walls 13 and 13 of the optical adapter 10 facing an upper surface 22a and a lower surface 22c of the ferrule main body 22, and the foreign material collecting portions 28 and 28. Thus, the increase of connection loss during a PC connection can be further avoided since foreign materials do not enter the gap between the connection end faces 21 and 21.

The ferrule main body 22 is formed by resin molding. The foreign material collecting portions 28 are formed concurrently with the ferrule main body 22. While, the foreign material collecting portions 28 may be formed by polishing the ferrule main body 22 formed by resin molding.

Figure 6A:
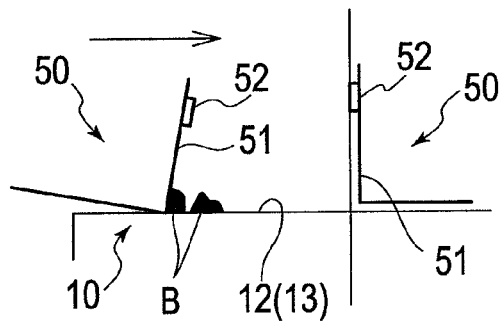
FIGS. 6A to 6C are schematic views showing connecting conditions of a conventional MT ferrule.
Figure 7A:
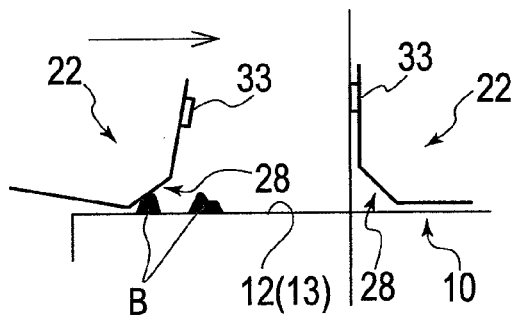
FIGS. 7A to 7C are schematic views showing connecting conditions of an optical ferrule according to an embodiment of the present invention.
Figure 6B:
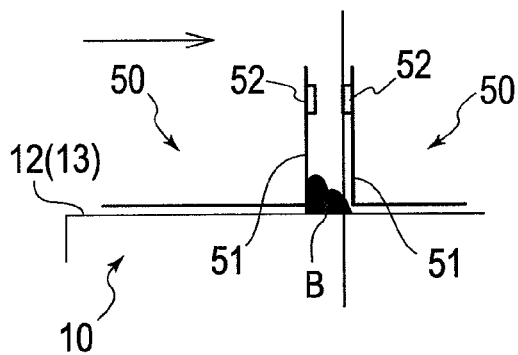
Figure 7B:
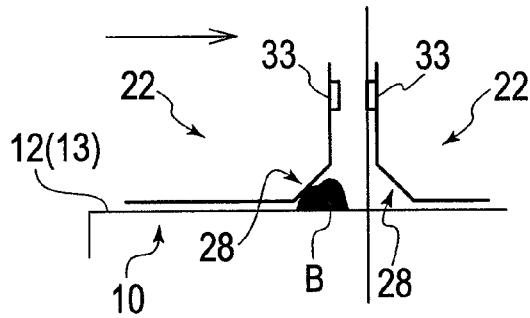
Figure 6C:
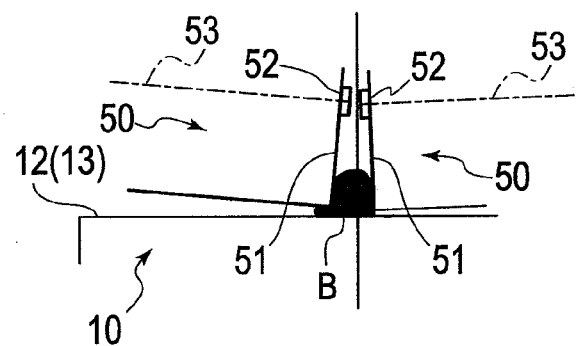
Figure 7C:
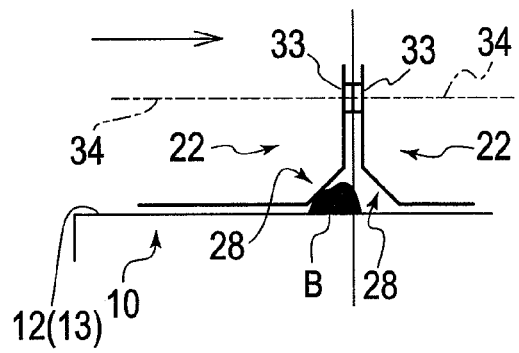

FIGS. 6A to 6C and FIGS. 7A to 7C are schematic views showing inserting conditions during a PC connection by a conventional optical ferrule and the optical ferrule according to the present embodiment, respectively. One side of the optical ferrule in every figure is assumed to have been inserted in the optical adapter. As shown in FIG. 6A and FIG. 7A, when foreign materials on the inner wall 12 (13) of the optical adapter 10 are adhered to the optical ferrule, it is highly possible that an inserting direction of every optical ferrule at an early stage is inclined to a butt-connecting direction. Also, it is highly possible that a part (such as a claw) of an arm as a latch mechanism in the optical adapter 10 is constantly in contact with the ferrule body. Therefore, as shown in FIG. 6A, a corner of a conventional optical ferrule 50 comes into contact with the inner wall 12 (13) or the arm, thereby gathering up foreign materials B that are to be adhered to a connection end face 51 of the optical ferrule 50. The foreign materials B are further pushed toward the opposite optical ferrule 50 (refer to FIG. 6B). Thus, the connection end faces 51 and 51 cannot keep parallel to each other due to a gap caused by the foreign materials B being held between the connection end faces 51 and 51 (refer to FIG. 6C). In such a condition shown in FIG. 6C, each optical axis 53 of optical fibers 52 and 52 are not aligned to each other, which causes an increase in connection loss. On the other hand, according to the present embodiment, the foreign material collecting portion 28 comes into contact with the foreign materials B even if the ferrule main body 22 is obliquely inserted into the optical adapter 10 as shown in FIG. 7A. The foreign materials B are further pushed toward the opposite optical ferrule 22 (refer to 7B). However, it is possible to prevent the foreign materials B from being adhered to the connection end faces 21 and 21 since the foreign materials B are collected in a space provided by the foreign material collecting portions 28 and 28 and the inner wall 12 (13) (refer to FIG. 7C). In other words, according to the present embodiment, the foreign material collecting portions 28 are configured so as to reduce friction between the ferrule main body 22 and the inner wall 12 (13) of the optical adapter 10 when the ferrule main body 22 is inserted being inclined to the butt-connecting direction and comes into contact with the opposite ferrule main body 22. The specific example of the configuration of the foreign material collecting portion 28 is the above-mentioned wall 28a. Accordingly, optical axes 34 and 34 of the respective optical fibers 33 and 33 are appropriately aligned as shown in FIG. 7C.

FIG. 1 shows a condition in which a pair of the optical ferrules according to the present embodiment are butt-connected in the optical adapter. However, a corresponding ferrule to be butt-connected according to the present embodiment may be an MT ferrule having a flat connecting surface without the grooves 25 and the protrusions 26. In such a case, however, it is still possible to avoid a negative effect caused by foreign materials remaining around the guide pins 32 and 32 due to the grooves 25 and 25 according to the present embodiment. In addition, since the protrusions 26 and 26 come into contact with the connection end face of the corresponding optical ferrule, the butt-connection between the connection end faces of the optical ferrules can be achieved while maintaining an even pressure between the joint areas 24 and 24. Moreover, it is possible to prevent connection loss caused by foreign materials inserted into a gap between the connection end faces from increasing since each foreign material collecting portion 28 cooperates with the inner wall 12 (13) of the optical adapter 10 and the connection end face of the corresponding optical ferrule to form a space for collecting foreign materials.

According to the above-mentioned embodiment, a cross-section of the groove 25 perpendicular to a extending direction has a rectangular shape. However, the cross-section of the groove 25 according to the present invention is not limited to the rectangular shape, and may be V-shaped or U-shaped. In addition, the connection end face 21 according to the present invention may be formed by obliquely polishing with respect to the vertical direction. Namely, the joint area 24 and the front end surfaces 26a and 26a of the protrusions 26 and 26 are obliquely polished with a desirable angle so that each surface is located on approximately the same level.

The optical ferrule according to the present invention is not limited to an MT ferrule, and applicable to every optical ferrule (such as an MPO ferrule) that is a connecting and positioning type using guide pins.

What is claimed is:

1. An optical ferrule butt-connected in an optical adapter, comprising:
    a ferrule main body;
    a connection end face formed in a front surface of the ferrule main body;
    a pair of grooves formed on the connection end face of the ferrule main body, the grooves extending from one end edge of the connection end face to an opposite end edge thereof;
    guide pin insertion holes formed in bottom surfaces of the respective grooves; and
    at least one optical fiber insertion hole formed in the connection end face and arranged in at least one line;
    wherein a width of each groove is larger than a diameter of each guide pin insertion hole,
    a flat or curved surface is formed at each of the other two end edges of the connection end face so as to form a space for collecting a foreign material with an opposite connection end face of a corresponding optical ferrule and an inner wall of the optical adapter.

2. The optical ferrule according to claim 1,
    wherein a flat or curved surface is formed at each of the one and the opposite end edges so as to form a space for collecting a foreign material with an opposite connection end face of a corresponding optical ferrule and an inner wall of the optical adapter.

* * * * *